United States Patent Office 3,053,883
Patented Sept. 11, 1962

3,053,883
USE OF METAL SALTS TO PROMOTE ESTERIFICATION
Fred Dean and Colin Bertie Cotterill, Norton-on-Tees, England, assignors to Imperial Chemical Industries Limited, London, England, a corporation of Great Britain
No Drawing. Filed June 19, 1961, Ser. No. 117,833
Claims priority, application Great Britain June 22, 1960
5 Claims. (Cl. 260—475)

This invention relates to the production of esters.

When an alcohol is reacted with a carboxylic acid or an anhydride thereof at elevated temperature, the ester formed is frequently coloured, particularly when an esterification catalyst is used. The development of colour in the ester is apparently associated with the presence of small amounts of oxidisable impurities in the reactants, particularly in the alcohol, and with the presence of oxygen even in small amounts, during the esterification process. The extent of colour formation may be affected by the materials used in the construction of the vessel in which the esterification reaction is conducted. Thus, a glass-lined reaction vessel does not accelerate the formation of coloured compounds, while a steel reaction vessel may do so.

Esters are used extensively, for example as plasticisers for synthetic resins such as polyvinyl chloride. Polyesters are used in the preparation of coating materials. In these and in other uses it is important that the ester or polyester is substantially colourless.

According to the present invention, there is provided a process for the production of substantially colourless esters which comprises reacting an alcohol with a carboxylic acid or an anhydride thereof at elevated temperature in the presence of a salt containing a metal in a lower valency state, the said salt having a greater affinity for oxygen than that possessed by the oxidisable impurities present in the reaction system and being insufficiently active to catalyse the oxidation of the said impurities.

Examples of suitable salts of metals in their lower valency state are salts in which the said metal is present in either the cation or in the anion or in both. The said metal may be, for example, copper, iron, tin or chromium and suitable salts are thus cuprous, ferrous and stannous salts. Specific examples of very suitable salts are cuprous chloride, ferrous sulphate and stannous sulphate. It is surprising that ferrous salts are effective because the use of iron reactors in commercial esterification reactions frequently leads to the formation of highly coloured esters.

The process of the present invention is usually carried out in the presence of a small quantity of a mineral acid-type catalyst, such as sulphuric acid or para-toluene sulphonic acid. It is inadvisable for the salt employed to react readily with the mineral acid present to give a volatile mineral acid such as hydrochloric acid. If the sulphuric acid present is used up to a considerable extent and a volatile acid such as hydrochloric acid is formed, this volatile acid is likely to escape under the reaction conditions, and in consequence the acidity of the reaction mixture will decrease. In turn, this leads to a slowing down of the esterification reaction. The suitability of any particular salt under a selected set of conditions may be easily determined by a simple trial. For instance, it might be expected in view of the statement given above concerning the loss of hydrochloric acid from the reaction mixture that the conjoint use of cuprous chloride and sulphuric acid is inadvisable, but in fact good results have been obtained by using these compounds together. This is probably due to the fact that the solubility of cuprous chloride in the reaction system is so small.

It is advantageous for the salt containing a metal in a lower valency state to be substantially insoluble in the reaction mixture. This enables most of the said salt to be removed from the ester after the esterification reaction is complete, by, for example, decantation, filtration or centrifugation. If the said salt and/or any of its oxidation products are soluble in the ester produced, they may be removed by washing with, for example, water, which may also serve to remove any esterification catalyst.

It is disclosed above that the salt containing the metal in a lower valency state should not catalyse the oxidation of impurities present in the reaction system. In consequence, highly active oxidation catalysts, such as salts of cobalt and manganese, are unsuitable for use in the process of the present invention.

The amount of the salt containing a metal in a lower valency state employed in the process of the present invention may be up to 10% or more of the weight of the reactants. Very much smaller quantities, for example as little as 0.5% by weight may be used, but in general the preferred amount lies in the range of 1 to 5% by weight of the reactants.

The salt containing a metal in its lower valency state may be added to one of the esterification reactants, for example the alcohol, before bringing it into contact with the other reactants. Alternatively, the reactants may first be mixed together and the said salt may then be added.

The acids which may be used in the process of the invention include, for example, aliphatic monocarboxylic and dicarboxylic acids such as adipic and sebacic acids and aromatic monocarboxylic and dicarboxylic acids such as benzoic acid and the phthalic acids. The acid may also be used in the form of its anhydride, for example, phthalic anhydride.

The alcohols which may be used in the process of the present invention include monohydric alcohols such as iso-octanol, 2-ethylhexanol and nonanol (3,5,5-trimethylhexanol-1) and dihydric alcohols such as ethylene glycol. The process of the present invention is particularly applicable to the esterification of alcohols or mixed alcohols produced by the Oxo process. Such alcohols may very suitably be submitted to a simple distillation process, in which for example 95 to 99% of the alcohol is obtained as an overhead fraction, before use in the process of the invention. The process of the invention is important for the production of phthalate esters of Oxo alcohols which are widely used as plasticisers.

The esterification process of the present invention may be carried out using known reaction conditions. Thus it is customary to use an amount of alcohol in excess of that theoretically required to react with the acid and to heat the alcohol and acid together in the presence of a small quantity of mineral acid-type catalyst as hereinbefore disclosed. It is also common practice to use an entrainer such as an inert hydrocarbon, for example toluene, to remove water from the reaction mixture. The esterification reaction may, if desired, also be carried out under an inert atmosphere, for example of nitrogen.

After the completion of the esterification reaction, the product may be treated, for example by filtration, to remove any residual salt of a metal in a lower valency state, which may then be re-used in the process. The esterification product may also be washed with, for example, water or aqueous alkali to remove the esterification catalyst and other soluble compounds. Volatile materials including excess alcohol may be removed from the ester by, for example, steam distillation and the recovered alcohol may be re-used in the esterification process.

*Example 1*

The following experiments were designed to demonstrate the efficiency of the process according to the invention in reducing colour formation during the esterification process which was deliberately conducted in the presence of air. The reaction conditions were carefully standardised.

The apparatus consisted of a round-bottomed glass flask fitted with a Dean and Stark head and decanter carrying a reflux condenser. The vapour line to the decanter was lagged with asbestos string. A 1 mm. diameter capillary tube was fitted into the flask through which air could be introduced into liquid contained in the flask.

A blank experiment was first conducted as follows using mixed $C_7$ to $C_9$ Oxo alcohols produced by reacting mixed alpha olefines from a wax-cracking process with carbon monoxide and hydrogen in the presence of a cobalt-containing catalyst and then hydrogenating the aldehyde produced.

30 gm. phthalic anhydride, 72 ml. of the mixed Oxo alcohols and 120 ml. toluene were introduced into the round-bottomed flask and heated on a water-bath until the phthalic anhydride had just dissolved. 2.0 ml. of 3 N sulphuric acid were then added to the flask which was then quickly placed on an electric heating mantle previously switched on, and connected to the remainder of the apparatus. The reaction mixture was colourless at this stage. Air was introduced into the reaction mixture at a constant rate of 1 litre per hour and the heating of the flask controlled so that the reaction mixture boiled steadily. Toluene and water formed in the reaction collected in the decanter. The water was removed as necessary while the toluene overflowed back to the flask.

After 3 hours reaction time measured from the moment the reaction mixture began to boil, the flask was cooled rapidly in ice, the reaction mixture weighed and the concentration of unconverted phthalic anhydride determined by titrating an aliquot with standard alkali. The percentage conversion of phthalic anhydride could thus be determined. The colour of the product was measured by means of a Lovibond tintometer using a 6 inch long cell.

The experiment was repeated exactly as described above except that 10 gm. cuprous chloride were added to the reactants immediately before addition of the sulphuric acid. After cooling the flask in ice, cuprous chloride was filtered from the reaction mixture before determining the conversion of phthalic anhydride and the colour of reaction product.

| Experiment No. | Additive | Percent conversion of phthalic anhydride | Lovibond colour | |
|---|---|---|---|---|
| | | | Yellow units | Red units |
| 1 | None | 99.5 | 32.0 | 5 |
| 2 | $Cu_2Cl_2$ | 96.5 | 3.4 | 1.1 |

NOTE.—In experiment No. 1, after 2 hours reaction time, 94.5% of the phthalic anhydride had been converted and the colour of the product was 15 yellow units and 3.0 red units.

Example 2

The apparatus and procedure were as in Example 1, experiment No. 2, except that 10 gm. of ferrous sulphate were added to the reaction mixture instead of 10 gm. of cuprous chloride.

The phthalic anhydride conversion was 99.9%, and the Lovibond colour of the product (6" cell) was 8.0 yellow, 2.2 red; this result is to be compared with that of the blank experiment, i.e. experiment No. 1 in Example 1.

Example 3

Example 2 was repeated except that 10 gm. of stannous sulphate were used instead of 10 gm. of ferrous sulphate. The phthalic anhydride conversion was 99.5%, and the Lovibond colour of the product (6" cell) was 1.5 yellow, 0.7 red.

Example 4

This example illustrates the isolation of a plasticiser ester prepared according to the invention.

The apparatus and procedure were as in Example 1, experiment No. 1, except that greater quantities of reagents were used as follows:

150 gm. phthalic anhydride
360 ml. mixed Oxo alcohols
600 ml. toluene
5 ml. 3 N sulphuric acid.

Esterification was carried out in the presence of 50 gm. stannous sulphate, air being passed through the reaction mixture at a rate of 1 litre per hour.

After 3 hours reaction time, the phthalic anhydride conversion was 99% and the colour of the mixture was 1.0 yellow, 0.4 red. The ester was isolated in the usual way by washing with aqueous caustic soda and water to remove the sulphuric acid esterification catalyst, and was steam stripped for 6 hours to remove toluene and unreacted alcohol and phthalic anhydride. The residual ester was separated from the water layer and dried over anhydrous sodium sulphate. The colour was 3.5 yellow, 1.2 red.

This phthalate ester was used as a plasticiser in the production of a clear film of polyvinyl chloride. The physical properties of this film, that is its low temperature flexibility and Shore hardness, electrical resistivity, thermal stability and colour were indistinguishable from the corresponding properties of a film made from commercially available di-alkanol phthalate, in spite of the fact that in the present experiment air was deliberately passed through the reaction mixture during esterification.

The above experiment was repeated in the absence of stannous sulphate. After three hours reaction time, the phthalic anhydride conversion was 96% and the colour was 20 yellow, 4.1 red.

Example 5

This example illustrates the application of the invention to an esterification process carried out at a higher temperature than in the other examples. The higher temperature was obtained by using a smaller proportion of toluene in the reaction mixture.

The apparatus and procedure were as in Example 4, except that only 120 ml. of toluene and 20 gm. of stannous sulphate were used and the reaction time was 65 minutes. The phthalic anhydride conversion was 99%. After filtering off the stannous sulphate, the liquid was too cloudy to enable the true colour to be determined. The ester was isolated as in Example 4 by caustic washing and steam stripping and was dried over anhydrous sodium sulphate. The colour was 7.4 yellow, 2.2 red. The ester so obtained was used as a plasticiser in the production of a clear polyvinyl chloride film. The physical properties of this, namely its low temperature flexibility and Shore hardness, electrical resistivity, thermal stability and colour were indistinguishable from the corresponding properties of a film made from commercially available di-alkanol phthalate, although the latter may have been produced at a lower temperature and was certainly produced in the absence of deliberately added air.

The above experiment was repeated in the absence of stannous sulphate. After a reaction time of 65 minutes, the phthalic anhydride conversion was 98% and the colour was 15 yellow, 4.1 red. The final colour of this ester after purification and drying over sodium sulphate was 22 yellow, 4.2 red.

We claim:
1. In a process for the production of esters which comprises reacting at an elevated temperature and in the presence of a mineral acid-type catalyst an alcohol with a compound selected from the group consisting of carboxylic acids and anhydrides thereof and wherein the reaction produces a color formation, the improvement comprising conducting said reaction in the presence of at least 0.5% by weight of the reactants of a metal salt selected from the group consisting of copper, iron, tin, and chromium salts, the said salt having a greater affinity for oxygen than that possessed by the oxidizable impurities present in the reaction system and being insufficiently active to catalyze the oxidation of said impurities, whereby a substantially colorless ester is attained as an end product of the reaction.

2. A process as claimed in claim 1 wherein the said metal salt is cuprous chloride.

3. A process as claimed in claim 1 wherein the said metal salt is ferrous sulphate.

4. A process as claimed in claim 1 wherein the said metal salt is stannous sulphate.

5. A process as claimed in claim 1 wherein said salt is in the amount of not more than 10% by weight.

References Cited in the file of this patent
FOREIGN PATENTS

| | | |
|---|---|---|
| 511,070 | Great Britain | Aug. 14, 1939 |
| 733,870 | Great Britain | July 29, 1955 |